United States Patent [19]

Breimer

[11] Patent Number: 4,626,914
[45] Date of Patent: Dec. 2, 1986

[54] CARRIER SYNCHRONIZING SYSTEM FOR LOCKING A REMOTELY LOCATED CARRIER GENERATOR TO A REFERENCE CARRIER GENERATOR AT A BASE STATION

[75] Inventor: Hendrik Breimer, Eindhoven, Netherlands

[73] Assignee: U.S. Philips Corporation, New York, N.Y.

[21] Appl. No.: 719,177

[22] Filed: Apr. 3, 1985

[30] Foreign Application Priority Data

Apr. 6, 1984 [NL] Netherlands .......................... 8401101

[51] Int. Cl.$^4$ .......................... H04N 5/04; H04N 9/44
[52] U.S. Cl. .................... 358/148; 358/149; 358/159; 358/17; 375/107; 455/51
[58] Field of Search ............... 358/17, 148, 149, 158, 358/159, 19; 375/106, 107; 455/51, 71

[56] References Cited

U.S. PATENT DOCUMENTS

| | | | |
|---|---|---|---|
| 4,214,261 | 7/1980 | Bazin et al. ......................... | 358/19 |
| 4,333,103 | 6/1982 | Koiwa et al. ....................... | 358/19 |
| 4,445,135 | 4/1984 | Heitmann et al. .................. | 358/19 |
| 4,532,547 | 7/1985 | Bennett .............................. | 358/148 |

Primary Examiner—Howard W. Britton
Assistant Examiner—John K. Peng
Attorney, Agent, or Firm—Thomas A. Briody; William J. Streeter; Marianne R. Rich

[57] ABSTRACT

The base station comprises a reference carrier generator and a synchronized carrier generator is provided in at least one remote station. Carrier synchronizing information is transmitted from the base station to the remote station and the synchronized carrier and information to be transmitted therewith are transmitted from the remote station to the base station. The base station has a periodically variable phase shifter to an input of which the synchronized carrier is applied, an output being coupled to a phase comparator to which in addition the reference carrier wave is applied. During first periods the phase shifter is subjected to a continuous phase shift. Second periods present in the first period are counted by a counter which is resettable under the control of the first periods. The counter is stopped by the phase comparator when a reference phase is reached during the phase shift. The counting result is numerical carrier synchronizing information, as required for a microprocessor or a micro-computer. The phase shift is effected incrementally, to an increasingly smaller portion of the carrier wave period near the zero phase.

9 Claims, 1 Drawing Figure

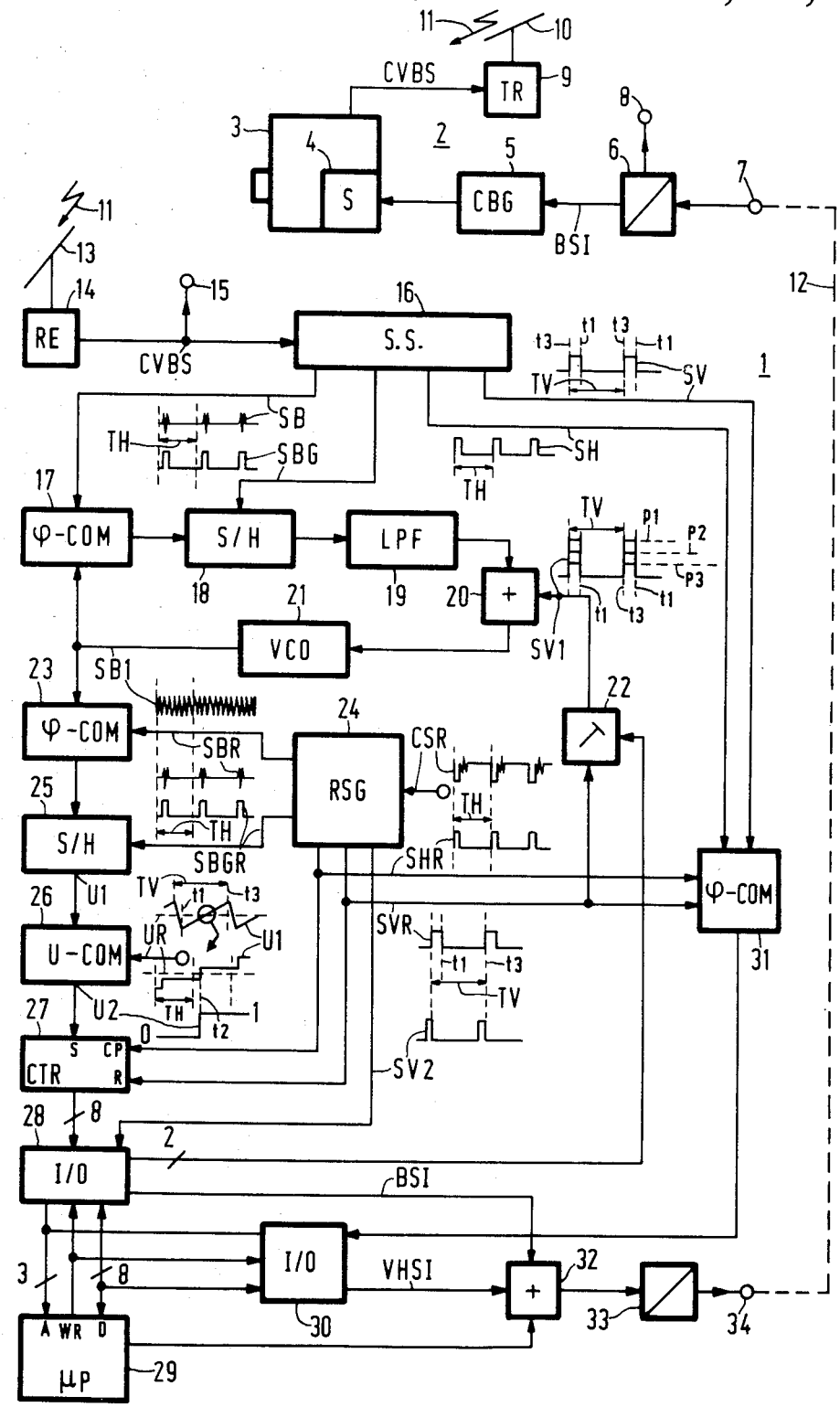

CARRIER SYNCHRONIZING SYSTEM FOR LOCKING A REMOTELY LOCATED CARRIER GENERATOR TO A REFERENCE CARRIER GENERATOR AT A BASE STATION

BACKGROUND OF THE INVENTION

1. Field of the Invention

The invention relates to a carrier synchronizing system, in which a reference carrier generator is present in a base station and a synchronized carrier generator in at least one remote station, carrier synchronizing information being transmitted from the base station to the remote station and a synchronized carrier and information to be transmitted therewith being transmitted from the remote station to the base station, the base station comprising a phase comparator to inputs of which the reference carrier and the synchronized carrier are applied, an output of the phase comparator supplying carrier synchronizing information to be transmitted, and to a base station suitable therefor.

2. Description of the Prior Art

Such carrier synchronizing systems are generally known. Colour television is an example of one of the possible fields of application. In colour television the carrier operates as a sub-carrier for the transmission of chrominance information. The base station may be a television studio for which there are several remote stations with television cameras. It is known to transmit the chrominance sub-carrier modulated by chrominance information via a microwave link, a coaxial cable or otherwise. The carrier synchronizing information can be transmitted via an audio link, such as a telephone line.

With the ever-continuing digitization of the equipment in carrier synchronizing systems it is desirable, for the ever wider use of micro-processors and micro-computers, to generate the carrier synchronizing information in numerical form and to transmit it for frequency and phase synchronization of the generator.

SUMMARY OF THE INVENTION

The invention has for its object to provide a carrier synchronizing system in which both frequency and phase synchronization can be obtained with the aid of numerical carrier synchronizing information. According to the invention, a carrier synchronizing system is characterized, in that the base station comprises a periodically variable phase shifter to an input of which the synchronized carrier is applied, an output being coupled to an input of the phase comparator, the base station comprising a generator for generating first and second periodic information components which occur with respective first and second periods, the first period comprising a plurality of second periods which each comprise a plurality of carrier periods, the periodically variable phase shifter receiving the first periodic information for providing a continuous phase shift during the first period, the phase comparator being followed by a resettable counter which is resettable under the control of the first periodic information components and to which the second periodic information components are applied as counting data, the counter being stopped by the phase comparator when the continuously shifted phase has become substantially equal to a reference phase, the counting result at counter outputs determining the carrier synchronizing information for the transmission.

The invention is based on the recognition that in the presence of a lower-frequency first and second periodic information components these information components can be utilized to synchronize the higher-frequency carrier. Then, the phase shift which continues during the first periods, and with the counting the number of periodic information components up to the moment of occurrence of a carrier reference phase results in a number which is a measure of the frequency and phase difference, respectively between the received synchronized carrier and the reference carrier.

So as to obtain an ample, fast pull-in feature of the carrier to be synchronized, an embodiment of the system according to the invention is characterized in that the continuous phase shift of the periodically variable phase shifter, effected during the first periods, occurs in the first instance during substantially the overall period of the carrier.

A further embodiment in which the fast pull-in changes into a slower pull-in, is characterized in that the continuous phase shift of the periodically variable phase shifter, effected during the first periods, occurs in the second instance during a portion of the carrier period near the zero phase.

A still further embodiment in which a very accurate phase synchronization is achieved and maintained, is characterized in that the continuous phase shift of the periodically variable phase shifter, effected during the first periods, occurs in the third instance during a still smaller portion of the carrier period near the zero phase, of the order of one percent.

A simple embodiment of the system according to the invention, is characterized in that the counter outputs are coupled to input-output equipment of a microprocessor which, depending on the counting result, decreases in steps the continuous phase shift effected during the first periods, to an increasingly smaller portion of the carrier period.

A system realized in accordance with the invention, having a substantially linear phase shift, is characterized in that the periodically variable phase shifter comprises a phase-locked loop circuit which, arranged between a low-pass filter and a voltage-controlled oscillator contained therein, comprises an adder circuit respectively, coupled to one of its inputs and to its output, the first periodic information in the form of a pulse having an adjustable pulse amplitude, being applied to a further input of the adder circuit for phase shifting purposes at the oscillator.

A further, simple embodiment is characterized in that said phase comparator is formed by a series arrangement of a phase comparator to which the reference carrier and the synchronized carrier are applied, a sample-and-hold circuit to a control input of which a gate pulse is applied and a voltage comparator to an input of which a reference voltage is applied, the output of the voltage comparator, carrying one of two possible voltages being connected to a stopping and a dominating setting input, respectively of the counter.

An embodiment of the carrier synchronizing system according to the invention, suitable for use in a colour television system in which the carrier operates as a chrominance sub-carrier, and is present as a periodic burst signal, is characterized in that the first periodic information is present in the form of field synchronizing pulses and the second periodic information is present in the form of line synchronizing pulses.

BRIEF DESCRIPTION OF THE DRAWING

The invention will now be described in greater detail by way of example with reference to the single sheet of accompanying drawing, which shows a block schematic circuit diagram of an embodiment of a carrier synchronizing system according to the invention.

DESCRIPTION OF THE PREFERRED EMBODIMENT

In the drawing, reference numeral 1 denotes a base station and reference numeral 2 denotes a remote station. Let station 2 be one out of a plurality of stations which may be located at some distance from the base station 1. Moreover, the station 2 may be a stationary or a mobile station. The drawing shows, by way of example, a colour television system in which the station 2, which may be either a mobile or a stationary station, comprises a colour television camera 3. It is however alternatively possible to describe examples of further fields of application. For a general carrier synchronizing system according to the invention the only important feature is, as will become apparent hereinafter, that first and second periodic information components are present in the system or are generated therein, the different first and second periods comprising a plurality of carrier periods. With colour television they are the periodic fields and line synchronizing information components, relative to a chrominance subcarrier.

A synchronizing signal source (S) incorporated in the camera 3 is denoted by reference numeral 4. The source 4 is synchronized from a carrier-wave generator (CBG) denoted by reference numeral 5 which is also synchronized. Carrier wave-synchronizing information BSI is applied to the generator 5 for controlling its frequency. The information BSI is, for example, periodically provided, with intervals, in the form of a number of bits. The carrier wave-synchronizing information BSI is received from a receiver circuit 6. The receiver circuit 6 is connected to an input terminal 7 of the station 2 and, from a terminal 8 supplies further information intended for the station 2. In the station 2 reference numeral 9 denotes a transmitter (TR) to which the camera 3 applies a, for example, standardized video signal CVBS, which contains colour (C), video (V), blanking (B) and synchronizing information components (S). The transmitter 9 transmits a television signal denoted by 11, via an aerial 10. Instead of via such an aerial link, the video signal or the television signal may alternatively be transmitted via a cable connection of an adequate bandwidth.

The input terminal 7 is connected to a special data or audio connection of a limited bandwidth, denoted by reference numeral 12. The connection 12 may be a telephone line to a stationary station 2 or a radio connection to a mobile station 2. Independent of the structure of the connection 12 having a pulse repetition rate of, for example, 2400 Bd, it is assumed that the carrier wave synchronizing information BSI and further (control and synchronizing) information components intended for the station 2 are received via this connection. The receiver circuit 6 is adapted to the structure of the connection 12. For the sake of completeness, it should be noted that the synchronized subcarrier wave generator 5 is shown separately, external of the source 4, but that it may form part thereof.

The television signal 11 transmitted by the station 2 and comprising inter alia the synchronized chrominance subcarrier (burst) and the colour information to be transmitted thereby is received in the base station 1 by an aerial 13, which forms part of a receiver (RE) denoted by reference numeral 14. The receiver 14 is shown schematically as a single block having an output at which the received video signal CVBS becomes available. The received signal CVBS can be taken from a terminal 15 for further processing operations in the station 1. To obtain some information components which are relevant to the described embodiment of the invention, the signal CVBS is applied in the manner shown to a signal separator (S.S.) which is denoted by reference numeral 16. The signal separator 16 is shown as having four outputs at which four signals shown next to them as a function of the time become available with field- (SV) and line synchronizing information (SH), a subcarrier burst (SB) and a burst gate information component (SBG).

The field synchronizing signal SV is shown as having two pulses of a periodical pulse sequence, at which a field period is denoted by TV. Two periodically occurring instants, denoted by t1 and t3, are shown next to the signal SV, namely at the trailing and the leading edges of the pulses. The line synchronizing signal SH is shown as having three pulses of a periodical pulse sequence, a line period being indicated by TH. For the case of standardized, interlaced 625 or 525-line television with a field frequency of 50 Hz and 60 Hz, respectively it follows that $TV=312.5\ TH$ and $TV=262.5\ TH$, respectively.

The signal SB is shown with bursts of the synchronized subcarrier which, in a standardized manner, is assumed to be present on the back porch of the line synchronizing pulses. These bursts are shown schematically and occur some time after the beginning of the line period TH. The signal SBG is shown as containing pulses which, as will become appararent hereinafter act as burst gate pulses and correspond to the burst duration of, for example, ten or nine carrier periods.

The carrier burst signal SB is applied to an input of a phase comparator ($\phi$-COM) which is denoted by reference numeral 17. The output of the phase comparator 17 is connected to a further input of the phase comparator 17 via a series arrangement of a sample-and-hold circuit 18 (S/H), a low-pass filter 19 (LPF), an adder circuit 20 and a voltage-controlled oscillator 21 (VCO). A control input of the circuit 18 receives the signal SBG from the circuit 16. A further input of the adder circuit 20 is connected to an output of a pulse amplitude setting circuit 22 to a signal input of which a reference field synchronizing signal SVR is applied. An information component, still further to be described, is applied to a second input of the circuit 22, which results in the output carrying a signal SV1 shown next to it. The signal SV1 is similar to the reference field synchronizing signal SVR but has an adjustable pulse amplitude, three values being designated by P1, P2 and P3. The components 17 to 22 form together a periodically variable phase shifter (17–22), in which a phase locked loop circuit (17–21) is included. The oscillator 21 supplies a regenerated carrier signal SB1 which frequency is equal to the frequency of the received, synchronized carrier burst signal SB. The average phase of the signal SB1 is determined by the phase of the signal SB. The carrier signal SB1 is submitted to a phase shift, a substantially linearly changing phase then occuring, more specifically over the field period TV between the instants t1 and t3. This linear phase variation is obtained with the aid of the signal SV1, as the pulses in the signal SV1 produce the phase shift at the oscillator 21, the magnitude of the phase shift between the instants t1 and t3 depending on the pulse amplitude P1, P2 or P3. Let it be assumed that in the first instance the pulse amplitude P1 is present and that the phase shift between the instants t1 and t3 of the field period TV extend from approximately $-180°$ to approximately $+180°$ of the carrier phase. Put differently: in the first instance the phase shift is effected during substantially the whole carrier period. Let it further be assumed that in the second and third instance, when the pulse amplitudes P2 and P3 respectively are present, these smaller pulse amplitude cause a smaller phase shift between the instants t1 and t3. Examples are a phase shift from approximately $-18°$ to approximately $+18°$ and from approximately $-1.8°$ to approximately $+1.8°$, respectively of the carrier phase. The phase shift then occurs during a portion of the period of the carrier near the zero phase and, in accordance with the choice made is in the order of magnitude of 10% and 1%. The construction of the periodically variable phase shifter (17-22) with the phase-locked-loop circuit (17-21) results in an adequate linearity at the phase shift, which is caused by the integrating character of the circuit (17-21). A phase shift of a sawtooth shape is associated with the pulse-shaped signal SV1.

The regenerated carrier signal SB1 having the frequency of the received synchronized carrier burst signal SB and the phase shift through the field period TV is applied to an input of a phase comparator, denoted by 23, to a further input of which the output of a reference signal generator (RSG) denoted by 24, is connected. SBR denotes a reference carrier burst signal produced by the generator 24. A composite synchronizing signal CSR is applied as a reference to the generator 24, which signal is shown next to the generator. Line synchronizing pulses and carrier bursts are shown, whilst in addition field synchronizing pulses are assumed to be present. In addition to the reference carrier burst signal SBR the generator 24 produces as further reference signals a carrier burst gate signal SBGR, a field synchronizing signal SVR and a line synchronizing signal SHR. A signal SV2 shown in the drawing represents a transfer signal which occurs with a pulse prior to the instant t3. The signal CSR is a station reference signal such as it is used in television studios. A further, non-synchronized construction of the reference signal generator 24 may be a construction comprising a very stable oscillator.

In the phase comparator 23 the reference burst signal SBR and the regenerated carrier signal SB1 are compared with each other, a variable voltage being present at the phase comparator output depending on the phase and frequency differences. The output of the phase comparator 23 is connected to a signal input of a sample-and-hold circuit, denoted by 25, to a control input of which the reference burst gate signal SBGR is applied. This results in the output of the circuit 25 carrying a voltage U1 which varies in step with the line period TH. The voltage U1 is applied to a voltage comparator (U-COM), denoted by 26, to a further input of which a reference voltage UR is applied. The drawing shows the voltage U1 which at the line frequency varies in steps relative to the constant reference voltage UR at the time base of both the line period TH and the field period TV. Considered over the overall field period TV, the voltage U1 has a sawtooth-shaped variation, the line-frequency steps being contained therein. The magntidue of the sawtooth amplitude depends on the pulse amplitude P1, P2 or P3 in the signal SV1, which pulse amplitude determines the range of the phase shift of the periodically variable phase shifter (17-22). The ranges of 360°, 36° and 3.6° of the carrier are already given for the phase shifts of the pulse amplitudes P1, P2 and P3. More and different ranges can be chosen. At the instant at which the voltage U1 reaches or passes the reference voltage UR, the output voltage, denoted by U2, of the voltage comparator 26 changes. Let it be assumed that this occurs at an instant t2, a logic 0 and 1 being shown at the two possible output voltage levels. The voltage U2 originates from a phase comparator (23, 25, 26), which is formed by the series arrangement of the phase comparator 23, the sample-and-hold circuit 25 and the voltage comparator 26, the instant t2 denoting the instant at which there is phase equality.

The voltage U2 is applied to a stop or dominating set input S of a resettable counter (CTR) which is denoted by 27. The field synchronizing signal SVR is applied to a dominating reset input R of the counter 27, whilst the line synchronizing signal SHR is applied to a clock pulse input CP. The result is that the counter 27, which is in the reset state from the instant t3 to the instant t1 counts the pulses in the signal SHR from the instant t1 until the counter 27 is stopped at the instant t2. The drawing shows that the counter 27 has 8 binary outputs, so that a count between 0 and 255 is possible. At the counter outputs the result becomes available of counting the number of pulses in the signal SHR occuring between the instants t1 and t2. With a larger or smaller phase difference between the signals SB1 and SBR, a smaller or larger number of line-frequency pulses, respectively are counted from the instant t1 to the instant at which there is phase equality, as the instant t2 occurs earlier or later, respectively. Detailed knowledge about the frequency difference is obtained by comparing consecutive counts.

The 8 outputs of the counter 27 are connected to 8 inputs of an input-output device (I/O), denoted by 28, of a micro-processor ($\mu$P) denoted by 29, which may form part of a micro-computer. The drawing shows an address bus having 3 address inputs A at the microprocessor 29, a write-read output WR and a two-way data bus having 8 data terminals D. The signal SV2 with the transfer pulse occuring prior to the instant t3 is applied to a control input of the input-output device 28. Then the counting result at the counter outputs becomes available at an output of the device 28, namely in the form of carrier synchronizing information BSI. Two outputs of the device 28 are connected to 2 setting inputs of the pulse amplitude-setting circuit 22, which, under the control of the micro-processor 29, carries a code word indicating which one of the three possible pulse amplitudes P1, P2 and P3 is present. The microprocessor 29 comprises information stipulating at which counting results a change from one to a different pulse amplitude must be made.

A further input-output device present at the microprocessor 29 is denoted by reference numeral 30, an input of the device being connected to an output of a phase comparator 31 to inputs of which the reference field and line synchronizing signals SVR and SHR, respectively and the received and separated field and line synchronizing signals SV and SH, respectively are applied. Under the control of the micro-processor 29 the device 30 supplies field and line synchronizing information VHSI. This sometimes occurs at the beginning of a synchronizing operation. The information components BSI and VHSI are applied to inputs of an adder circuit 32, a further input of which is connected to an output of the micro-processor 29 which produces, for example, control information components for the station 2. The output of the adder circuit 32 is connected to an input of a transmitter circuit 33 an output of which is connected to an output terminal 34 of the station 1, which terminal is connected to the special data or audio connection 12. The transmitter circuit 33 is adapted to the structure of the link 12.

The above construction of the station 1 with the micro-processor 29 for predominantly synchronizing the carrier, requires the presence of the numerical carrier synchronizing information. This information is predominantly obtained with the aid of the periodically variable phase shifter (17–22), the phase comparator (23, 25, 26) and the resettable counter 27, to which in a colour television system the periodic field an line synchronizing information components (SVR and SHR) are applied. Although the drawing only shows the application of the invention to a colour television system, the invention is in its generality suitable for use for carrier synchronization. The phase comparator 31 is then omitted and no signals SH and SV are separated. The generator 24 then generates first (comparable to SVR) and a second (comparable to SHR) periodic information components which occur with a first and a second period, respectively (comparable to TV and TH, respectively), the first period comprising a plurality of second periods which each comprise a plurality of carrier periods. In this situation, the periodically variable phase shifter (17–22) receives the first periodic information for realizing the phase shift which continues during the first period. The phase comparator 23 is then followed by the resettable counter 27, which is resettable under the control of the first periodic information. The second periodic information components are applied as counting information to the counter 27, the counter 27 being stopped by the phase comparator 23 when the continuously shifted phase becomes equal to the reference phase, the counting result at counter outputs determining the carrier synchronizing information BSI for the transmission. Instead of having generator 24 produce the first and second periodic information components it is alternatively possible to have these components be produced by the micro-processor 29.

For such a general carrier synchronizing system the first and second periods can be chosen more or less randomly. Of fundamental importance is that the counting capacity is adequately large to enable counting of the number of second periods comprised in the first period, until the occurrence of the reference phase. Thus, it holds for the given example in colour television that for TV=312.5 TH or TV=262.5 TH the counting capacity having 8 bits covers the range from 0 to 255. For this choice of the 8-bit word a measuring accuracy to $1/255^{th}$ or 1.4°, 0.14° and 0.014°, respectively of the carrier, for respective carrier shifts through 360°, 36° and 3.6° is achieved.

If on synchronization each individual counting result results in a carrier synchronizing information component BSI which is transmitted, this occurs 50 or 60 times per second in the examples described. Let it be assumed that 5 to 6 times per second can already result in a sufficiently fast and accurate synchronization. Then, consecutive counting results can be averaged, on which average the carrier synchronizing information BSI is based. If there are a plurality of remote stations 2 they can be synchronized in a time-division multiplex system.

For the sake of completeness, it should be noted that the types 8085 and 8255 of Intel (registered trade mark) are suitable to be used as the micro-processor 29 and the input-output devices 28, 30, respectively. An alternative choice is a combined integrated circuit comprising the micro-processor 29 and the input-output devices 28 and 30. The Signetics type TCA 240 can be used for the comparators 17, 23, 26 and 31. The sample-and-hold circuits 18 and 25 may comprise field-effect transistors. In this case integration of these components is also possible.

What is claimed is:

1. A carrier synchronizing system, in which a reference carrier generator is present in a base station and a synchronized carrier generator in at least one remote station, carrier synchronizing information being transmitted from the base station to the remote station and a synchronized carrier and information to be transmitted therewith being transmitted from the remote station to the base station, the base station comprising a phase comparator means for generating carrier synchronizing information, characterized in that the base station comprises a periodically variable phase shifter to an input of which the synchronized carrier is applied, an output being coupled to an input of the phase comparator, the base station comprising a reference carrier generator for generating first and second periodic information components which occur with respective first and second periods, the first period comprising a plurality of second periods which each comprise a plurality of carrier periods, the periodically variable phase shifter receiving the first periodic information for providing a continuing phase shift during the first period, the phase comparator being followed by a resettable counter which is resettable under the control of the first periodic information components and to which the second periodic information components are applied as counting information, the counter being stopped by the phase comparator when the continuously shifted phase has become substantially equal to a reference phase, the counting result at counter outputs determining the carrier synchronizing information.

2. A carrier synchronizing system as claimed in claims 1, characterized in that the counter outputs are coupled to input-output equipment of a micro-processor which, depending on the counting result, decreases in steps the continuous phase shift effected during the first period, to an increasingly smaller portion of the carrier period.

3. A carrier synchronizing system as claimed in claims 1, characterized in that the periodically variable phase shifter comprises a phase-locked loop circuit which, arranged between a low-pass filter and a voltage-controlled oscillator contained therein, comprises an adder circuit respectively coupled to one of its inputs and to its output, the first periodic information in the form of a pulse having an adjustable pulse amplitude being applied to a further input of the adder circuit for phase shifting purposes at the oscillator.

4. A carrier synchronizing system as claimed in claims 1, characterized in that said phase comparator is formed by a series arrangement of a phase shifter to which the reference carrier and the synchronized carrier are applied, a sample-and-hold circuit to a control input of which a gate pulse is applied and a voltage comparator to an input of which a reference voltage is applied, the output of the voltage comparator carrying one of two possible voltages being connected to a stop and a dominating set input, respectively of the counter.

5. A carrier synchronizing system as claimed in the claims 1, suitable for use in a colour television system in which the carrier operates as a chrominance subcarrier and is present as a periodic burst signal, characterized in that the first periodic information is present in the form of field synchronizing pulses and the second periodic information is present in the form of line synchronizing pulses.

6. A carrier synchronizing system as claimed in claim 1, characterized in that the continuous phase shift of the periodically variable phase shifter, effected during the first period, occurs in the first instance during substantially the overall period of the carrier.

7. A carrier synchronizing system as claimed in claim 6, characterized in that the continuous phase shift of the periodically variable phase shifter, effected during the first periods, occurs in the second instance during a portion of the carrier period near the zero phase.

8. A carrier synchronizing system as claimed in claim 7, characterized in that the continuous phase shift of the periodically variable phase shifter, effected during the first periods, occurs in the third instance during a still smaller portion of the carrier period near the zero phase, of the order of one percent.

9. Apparatus for synchronizing a remote carrier signal generated in a remote station to a reference carrier signal generated at a base station, comprising
    means for transmitting said remote carrier signal back to said base station;
    at said base station:
    means for generating first and second periodic information component signals having, respectively, a first period and a second period, said first period comprising a plurality of said second periods, each of said second periods comprising a plurality of carrier periods;
    receiving means for receiving said remote carrier signal and generating a received carrier signal in response thereto;
    variable phase shift means connected to receive said received carrier signal and vary the phase thereof during said first period at least in part in accordance with phase shift control signals applied thereto, thereby generating a phase shifted carrier signal;
    phase comparator means connected to receive said phase shifted carrier signal and said reference carrier signal for generating a phase comparator output signal corresponding to the phase difference between the so applied signals;
    means connected to said phase comparator means for generating digital synchronizing information corresponding to said phase comparator output signal, said digital synchronizing information generating means comprising means for generating a counter stop signal when said phase comparator output signal has a predetermined phase reference value, and counting means having a counting input receiving said second periodic signals, a reset input receiving said first periodic signals, a stop input receiving said counter stop signals and a counter output furnishing a counting signal constituting said carrier synchronizing information signal;
    means for generating said phase shift control signals in accordance with said carrier synchronizing information signals and applying said phase shift control signals to said variable phase shift means;
    means for transmitting said carrier synchronizing information to said remote station; and
    at said remote station:
    means for receiving said carrier synchronizing information and adjusting the phase of said remote carrier signal in accordance therewith.

* * * * *